(12) United States Patent
Heo et al.

(10) Patent No.: US 10,454,334 B2
(45) Date of Patent: Oct. 22, 2019

(54) COMPRESSOR

(71) Applicant: Hanon Systems, Daejeon (KR)

(72) Inventors: Jeong Gil Heo, Daejeon (KR); Jeong Ki Seo, Daejeon (KR); Shinji Tagami, Daejeon (KR); Bong Kyun Seo, Daejeon (KR); Kyung Jae Lee, Daejeon (KR)

(73) Assignee: Hanon Systems, Daejeon (KR)

(*) Notice: Subject to any disclaimer, the term of this patent is extended or adjusted under 35 U.S.C. 154(b) by 0 days.

(21) Appl. No.: 15/575,251

(22) PCT Filed: Nov. 11, 2016

(86) PCT No.: PCT/KR2016/013045
§ 371 (c)(1),
(2) Date: Nov. 17, 2017

(87) PCT Pub. No.: WO2017/183783
PCT Pub. Date: Oct. 26, 2017

(65) Prior Publication Data
US 2019/0052144 A1 Feb. 14, 2019

(30) Foreign Application Priority Data

Apr. 22, 2016 (KR) .................. 10-2016-0049071
Sep. 8, 2016 (KR) .................. 10-2016-0115825

(51) Int. Cl.
*H02K 5/10* (2006.01)
*F04B 35/04* (2006.01)
(Continued)

(52) U.S. Cl.
CPC ............ *H02K 5/10* (2013.01); *B60H 1/3229* (2013.01); *F04B 35/04* (2013.01); *F04B 39/12* (2013.01);
(Continued)

(58) Field of Classification Search
CPC ................................ H02K 5/225; H02K 5/10
See application file for complete search history.

(56) References Cited

U.S. PATENT DOCUMENTS

| | | | | |
|---|---|---|---|---|
| 7,461,873 | B2 * | 12/2008 | Machida | E05B 81/20 292/337 |
| 8,323,005 | B2 * | 12/2012 | Yamada | F04C 23/008 310/194 |
| 2013/0004345 | A1 * | 1/2013 | Horiba | F01C 21/007 417/411 |

FOREIGN PATENT DOCUMENTS

| | | |
|---|---|---|
| JP | 2010065625 A | 3/2010 |
| JP | 2011058388 A | 3/2011 |

(Continued)

*Primary Examiner* — Dang D Le
(74) *Attorney, Agent, or Firm* — Norton Rose Fulbright US LLP

(57) ABSTRACT

Disclosed herein is a compressor including a motor configured to generate a driving force, a compression mechanism driven by the motor to compress a refrigerant, an inverter configured to control the motor, a connector configured to electrically connect the motor and the inverter, and a sealing member configured to seal a motor terminal of the motor that is electrically connected to the connector. Accordingly, it is possible to prevent an electric leakage from occurring in the terminal of the motor by blocking introduction of a refrigerant into the motor terminal. It is possible to prevent separation of the connector and the coil from the motor terminal.

18 Claims, 11 Drawing Sheets

(51) Int. Cl.
  *F04B 39/12* (2006.01)
  *H02K 5/22* (2006.01)
  *F04C 27/00* (2006.01)
  *F04C 18/02* (2006.01)
  *B60H 1/32* (2006.01)

(52) U.S. Cl.
  CPC ........ *F04B 39/121* (2013.01); *F04C 18/0215* (2013.01); *F04C 27/008* (2013.01); *H02K 5/225* (2013.01); *F04C 2240/40* (2013.01); *F04C 2240/803* (2013.01); *F04C 2240/808* (2013.01)

(56) References Cited

FOREIGN PATENT DOCUMENTS

| | | | |
|---|---|---|---|
| JP | 2013148037 | A | 8/2013 |
| KR | 20110036958 | A | 4/2011 |
| KR | 20130002268 | A | 1/2013 |
| KR | 20150109156 | A | 10/2015 |

* cited by examiner

[FIG. 1]
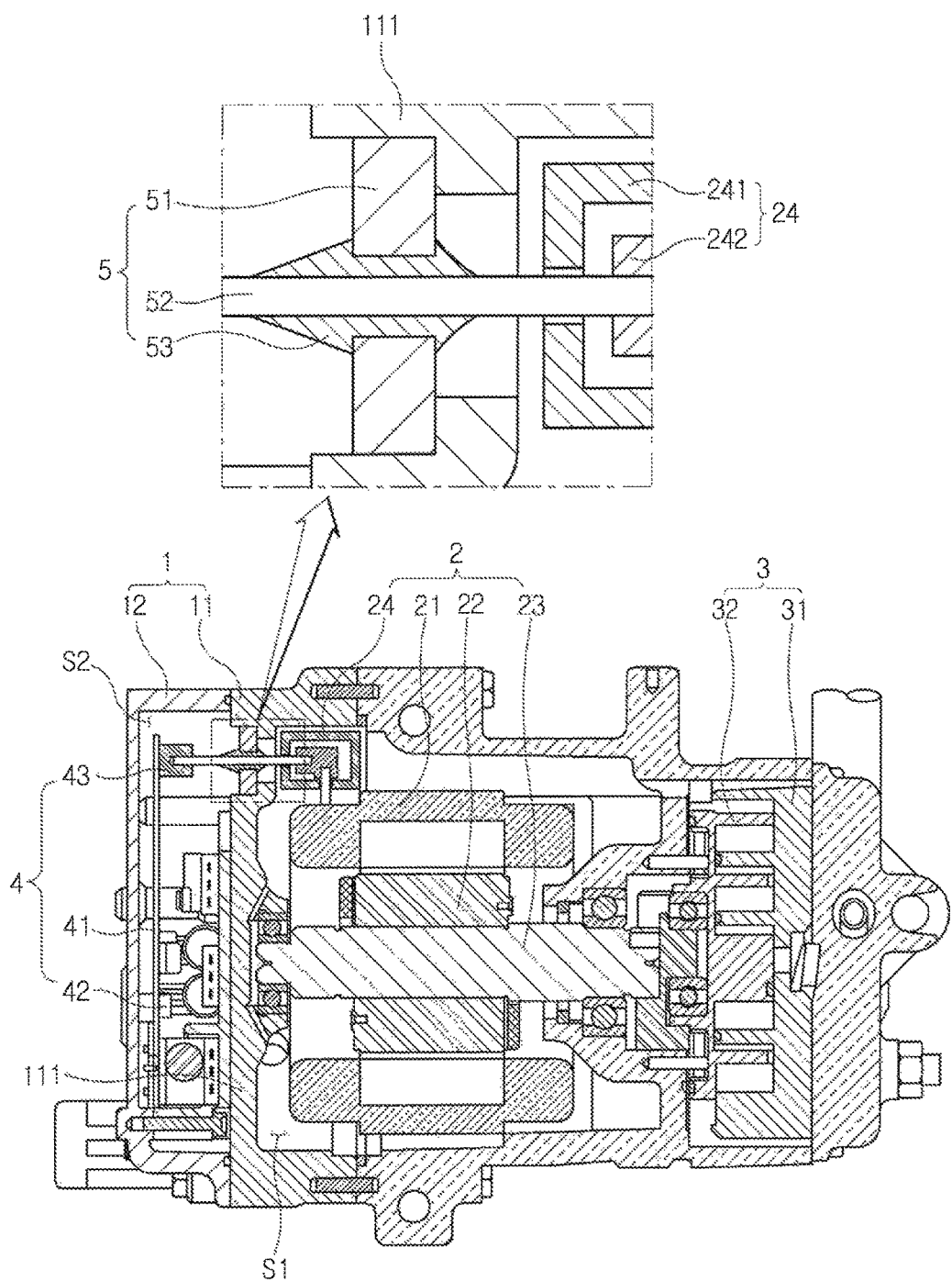

[FIG. 2]
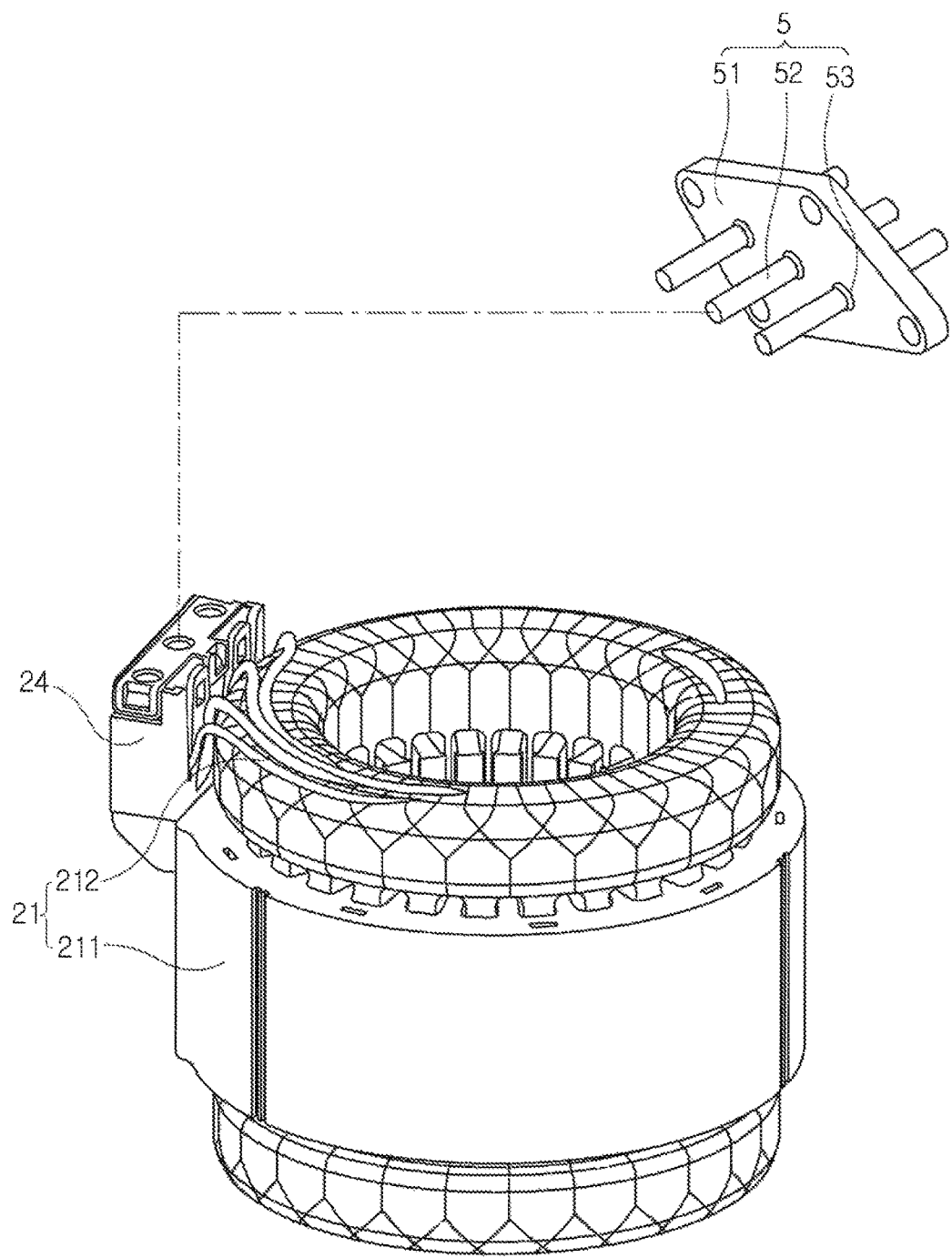

[FIG. 3]
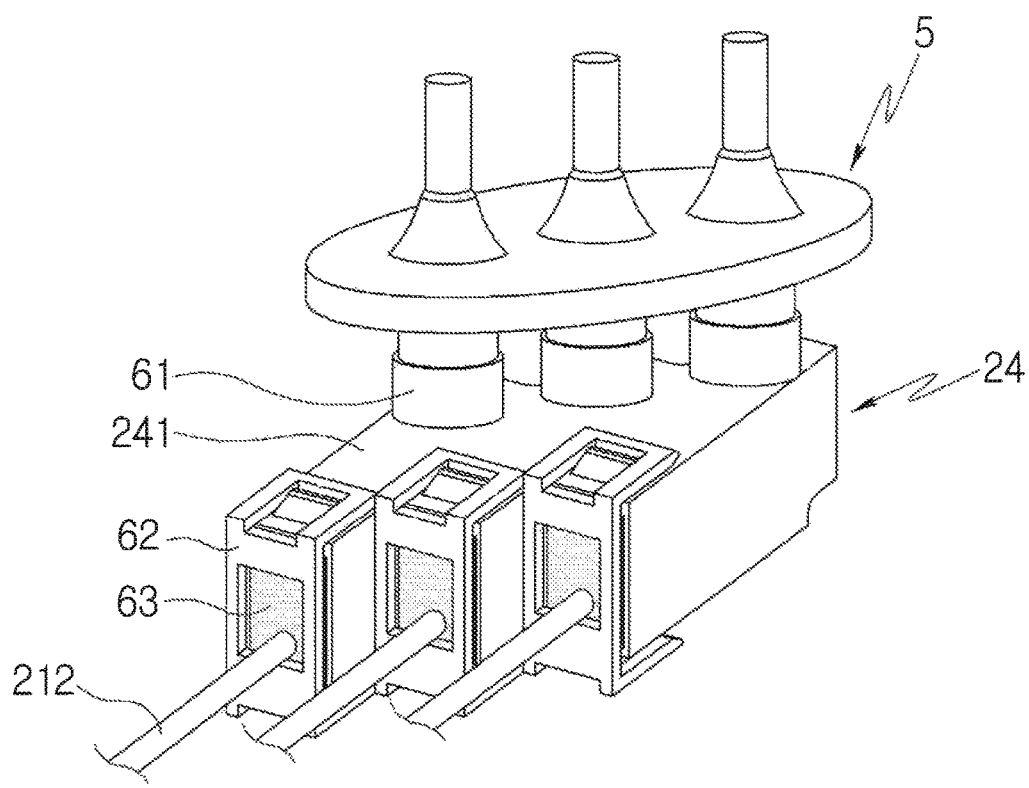

[FIG. 4]
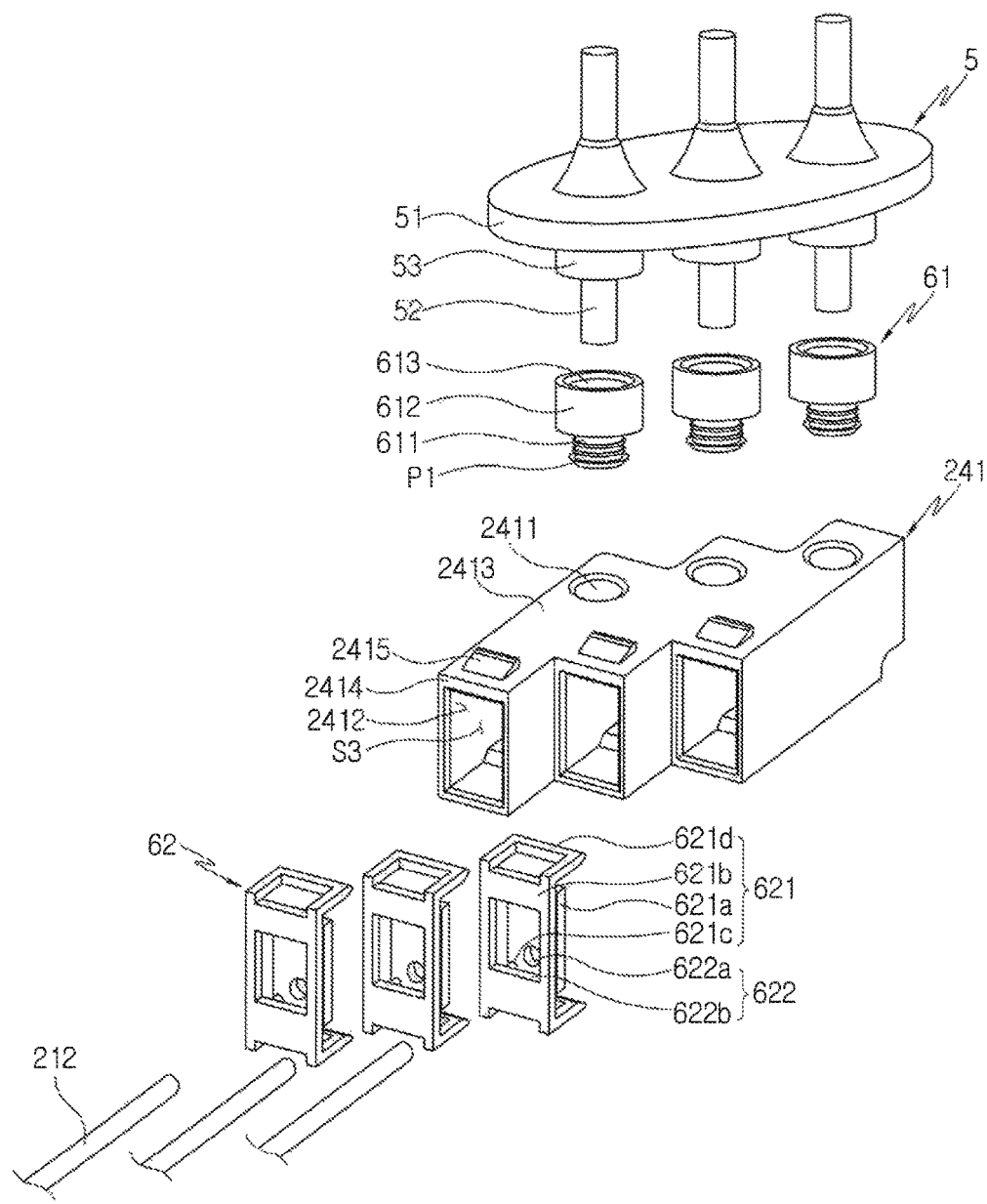

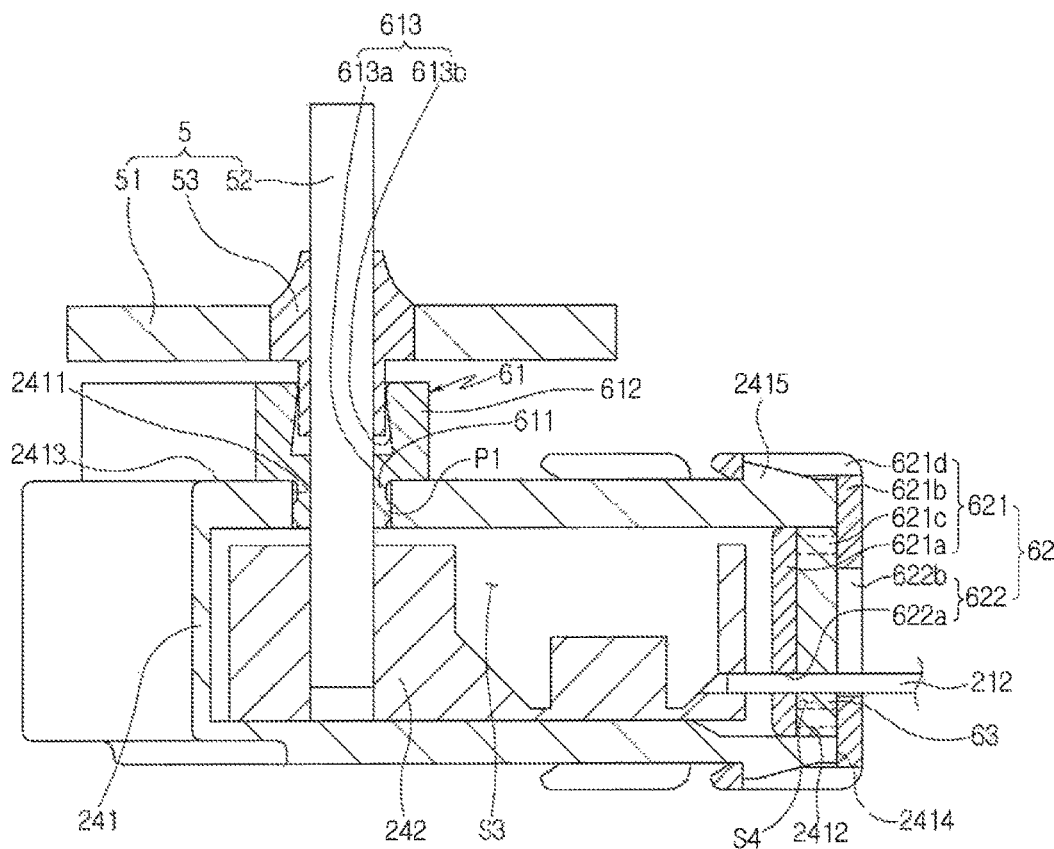
[FIG. 5]

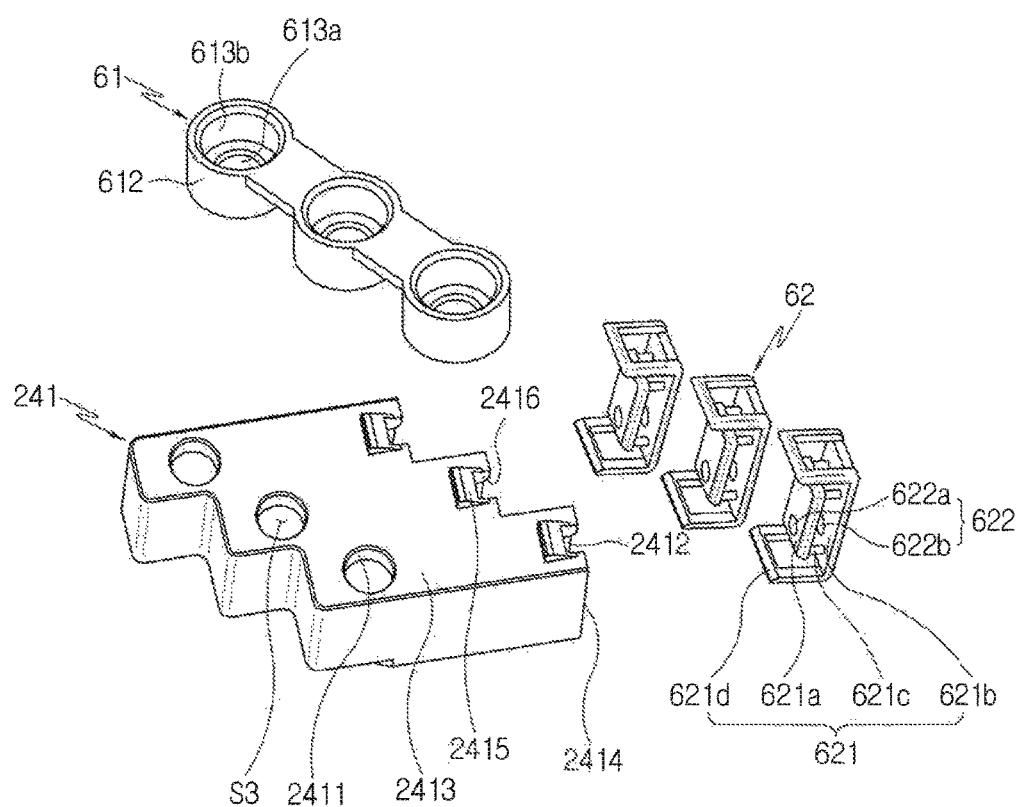
[FIG. 6]

[FIG. 7]
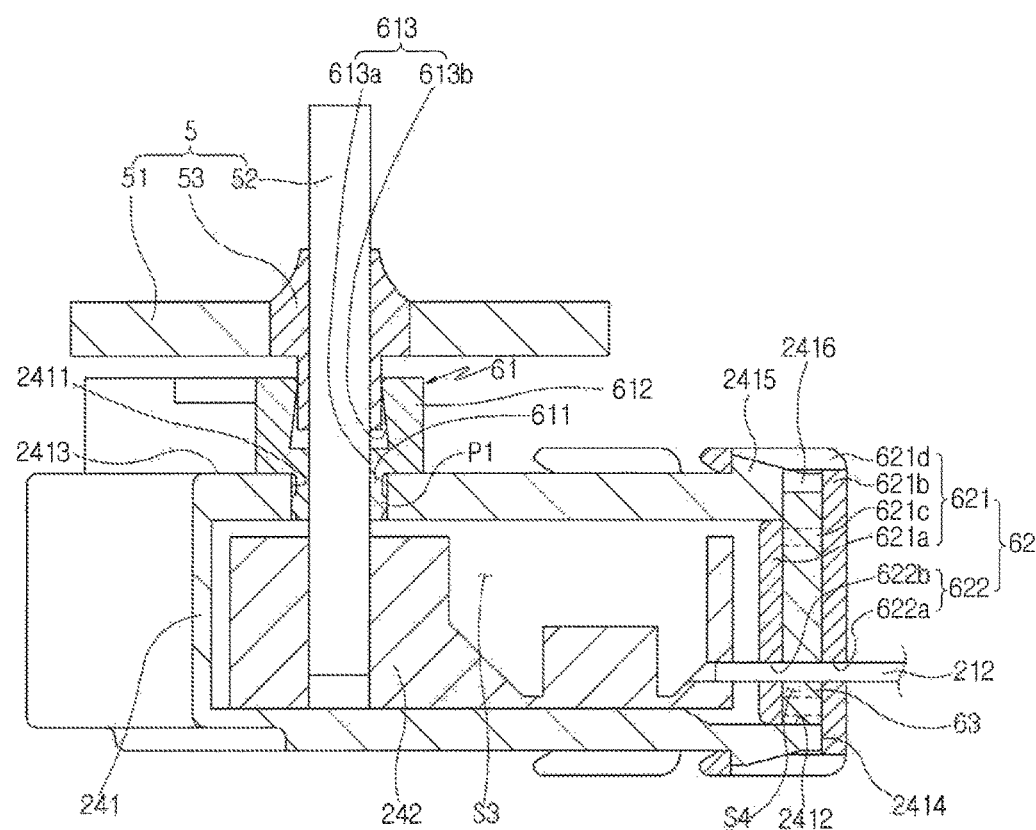

[FIG. 8]
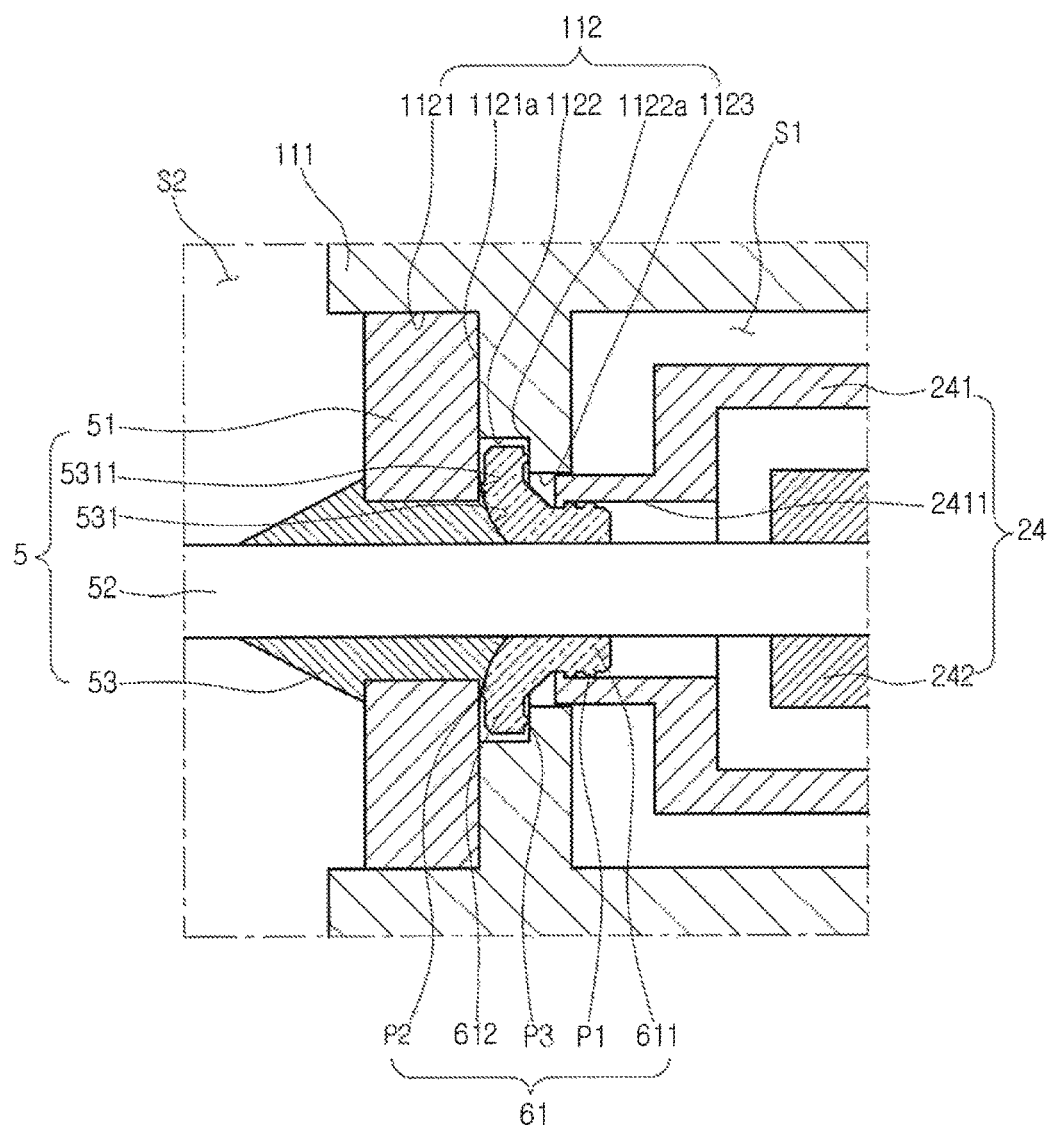

[FIG. 9]
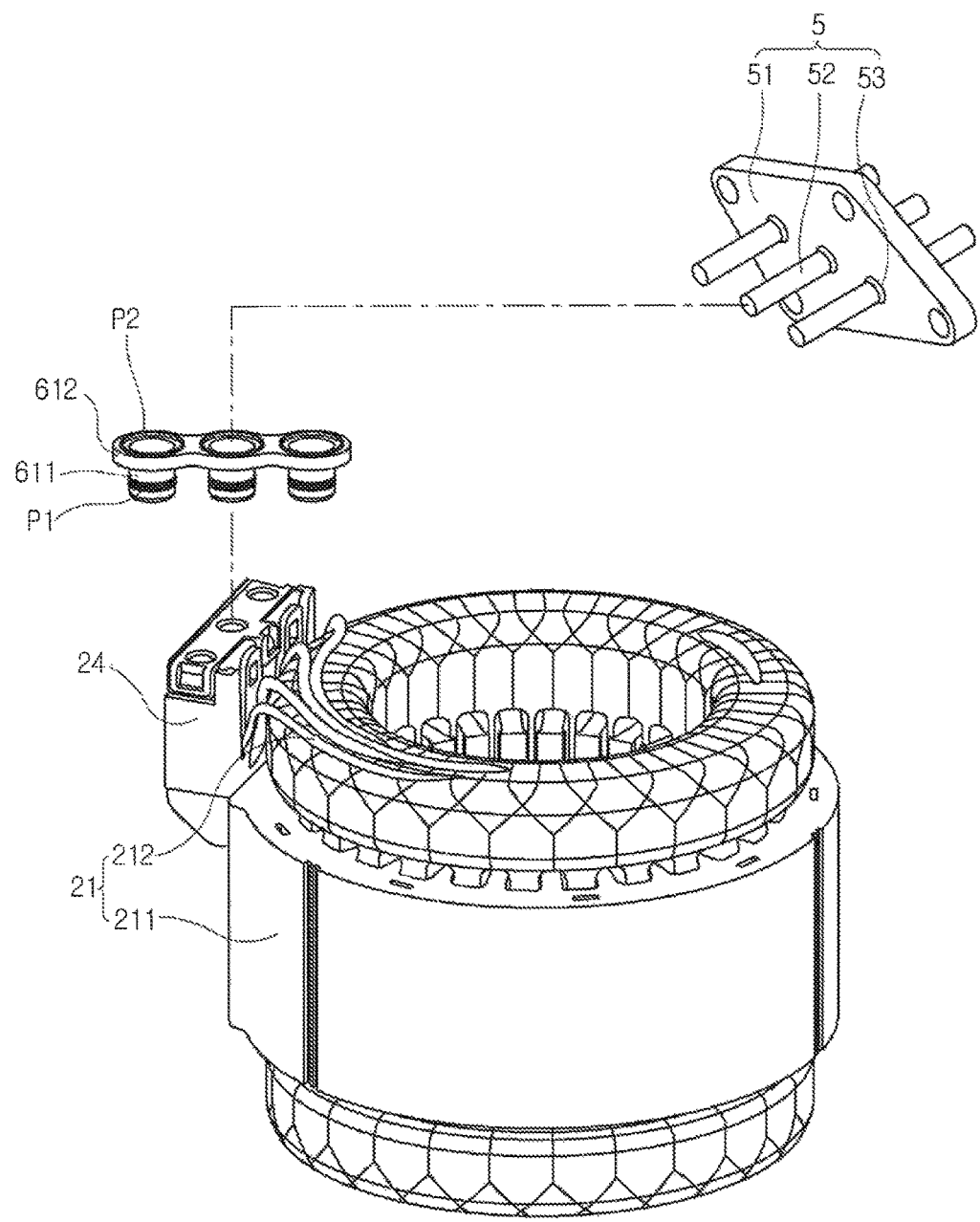

[FIG. 10]
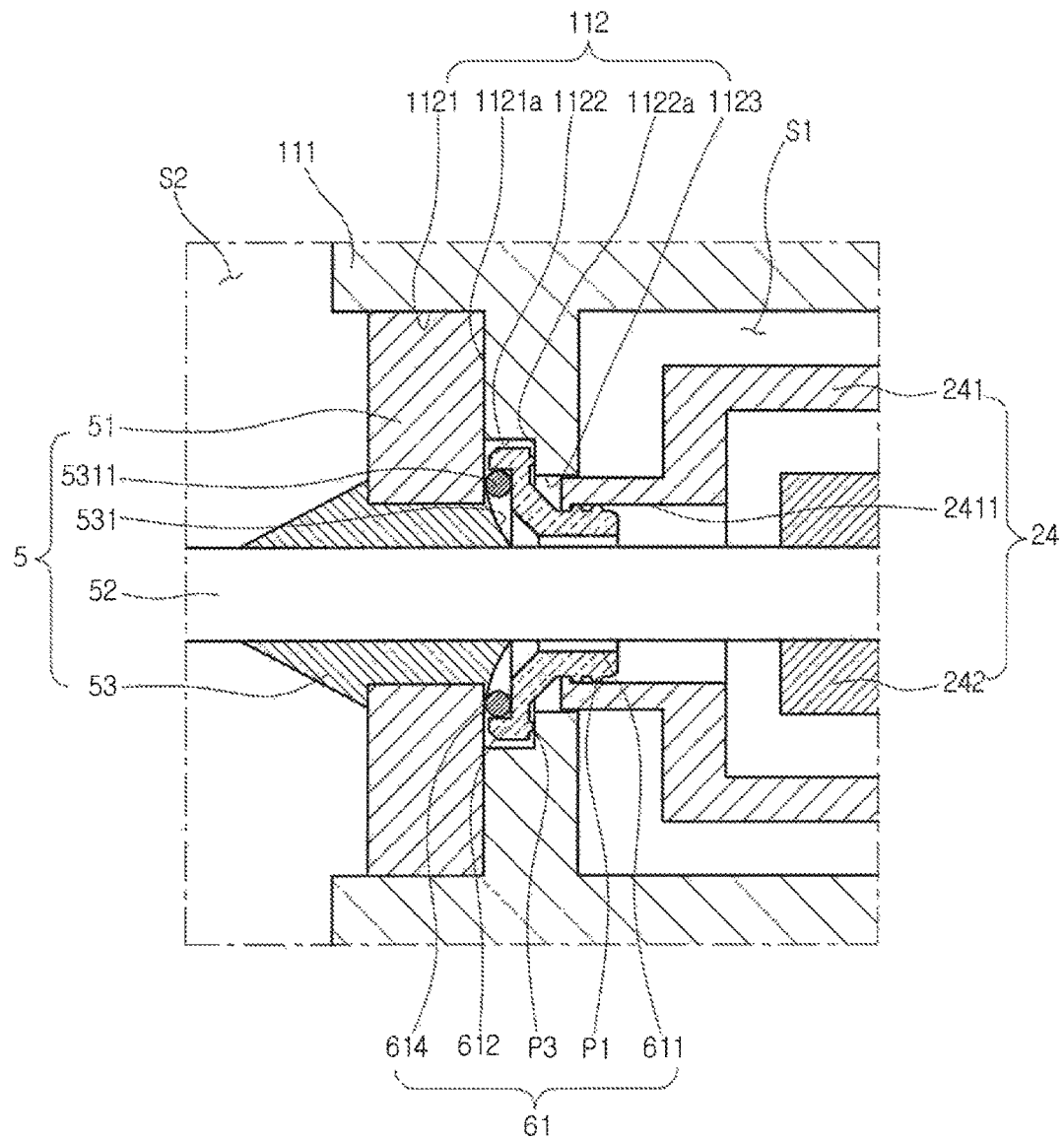

[FIG. 11]
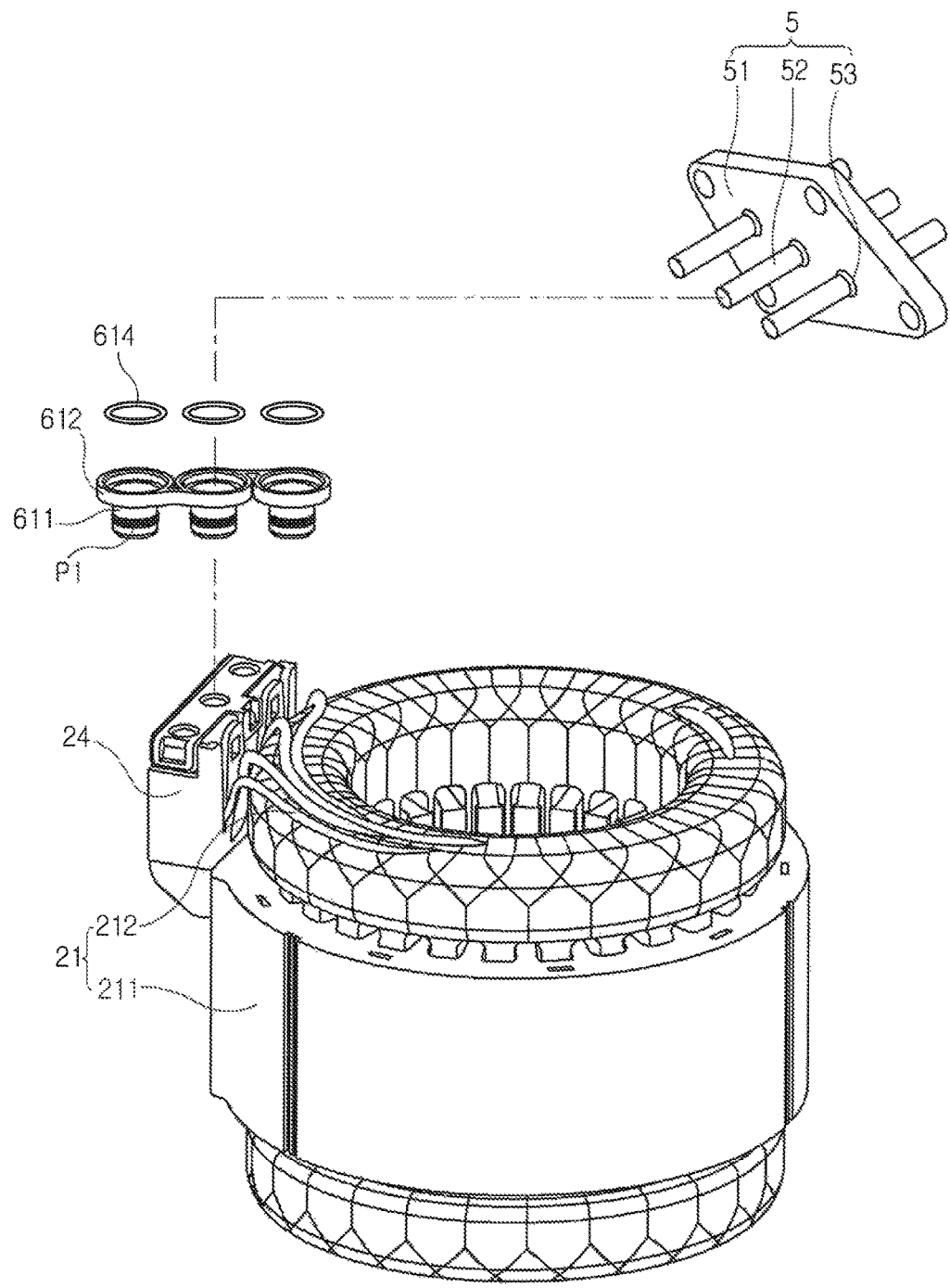

COMPRESSOR

CROSS-REFERENCES TO RELATED APPLICATIONS

This application is a 371 of International Application No, PCT/KR2016/013045 filed Nov. 11, 2016, which claims priority from Korean Patent Application Nos. 10-2016-0049071 filed on Apr. 22, 2016 and 10-2016-0115825 filed on Sep. 8, 2016.

TECHNICAL FIELD

The present invention relates to a compressor, and more particularly, to a compressor capable of compressing a refrigerant using driving force of a motor controlled by an inverter

BACKGROUND ART

In general, a compressor used for an air conditioning system of a vehicle functions to convert the evaporated refrigerant sucked from an evaporator into a high-temperature and high-pressure refrigerant to be prone to liquefaction, and to transfer the converted refrigerant to a condenser.

The compressor is classified according to the compression operation thereof, and performs the compression operation by driving force provided from the engine of the vehicle or by driving of an electric motor (hereinafter, referred to be as a motor) using electric power supplied separately.

FIG. 1 is a cross-sectional view illustrating a conventional compressor that performs a compression operation by driving of a motor. FIG. 2 is an exploded perspective view illustrating a connector and a motor terminal of FIG. 1.

Referring to FIGS. 1 and 2, the conventional compressor includes, within a casing 1, a motor 2 that generates driving force, a compression mechanism 3 that is driven by the motor 2 to compress a refrigerant, an inverter 4 that controls the motor 2, and a connector 5 that electrically connects the motor 2 and the inverter 4, and variably adjusts cooling efficiency while adjusting a revolutions per minute of the motor 2 by the control of the inverter 4.

Here, the motor 2 is typically provided in a motor accommodation space S1 defined at one side of the casing 1, the inverter 4 is typically provided in an inverter accommodation space S2 defined at one side of the casing 1, and the connector 5 seals the motor accommodation space S1 and the inverter accommodation space S2 and is connected to a terminal 24 of the motor 2 (hereinafter, referred to as a motor terminal) and a terminal 43 of the inverter 4 (hereinafter, referred to as an inverter terminal) to electrically connect the motor 2 and the inverter 4.

The connector 5 includes a terminal pin 52 that connects the motor 2 and the inverter 4 through a terminal holder 51 to be described later, the terminal holder 51 that supports the terminal pin 52 and seals the motor accommodation space S 1 and the inverter accommodation space S2, and an insulator 53 that insulates between the terminal holder 51 and the terminal pin 52.

The motor terminal 24 electrically connects a coil 212 extending from the motor 2 to the connector 5.

Specifically, the motor terminal 24 includes a terminal block 241 having an internal space therein, and a connection terminal 242 that is made of a conductive material and is provided in the internal space of the terminal block 241.

The connection terminal 242 is connected to the coil 212, which is inserted into the internal space of the terminal block 241 through the terminal block 241, and to the connector 5, which is inserted into the internal space of the terminal block 241 through the terminal block 241, thereby electrically connecting the coil 212 and the connector 5.

However, the conventional compressor is problematic in that an electric leakage occurs in an electric circuit between the inverter 4 and the motor 2 due to the refrigerant. Specifically, an electric leakage may occur in the motor terminal 24 due to the refrigerant introduced into the terminal block 241. That is, the current flowing in the coil 212, the connection terminal 242, and the connector 5 may be shorted to the terminal block 241 due to the refrigerant. Hence, the compressor may malfunction and be damaged. Meanwhile, since the refrigerant in the motor accommodation space S1 is introduced into the inverter accommodation space S2 through the connecting portion between the connector 5 and the casing 1, an electric leakage may occur in the inverter 4.

In addition, the coil 212 and the connector 5 may be separated from the motor terminal 24 due to vibration.

DISCLOSURE

Technical Problem

Accordingly, the present invention has been made in view of the above-mentioned problems, and an object thereof is to provide a compressor capable of preventing an electric leakage from occurring in an electric circuit between an inverter and a motor due to a refrigerant.

In addition, another object of the present invention is to provide a compressor capable of preventing separation of a coil and a connector from a motor terminal due to vibration.

Technical Solution

In accordance with an aspect of the present invention, a compressor includes a motor configured to generate a driving force, a compression mechanism driven by the motor to compress a refrigerant, an inverter configured to control the motor, a connector configured to electrically connect the motor and the inverter, and a sealing member configured to seal a motor terminal of the motor that is electrically connected to the connector.

The connector may include a terminal pin configured to electrically connect the motor and the inverter, a terminal holder configured to support the terminal pin, and an insulator configured to insulate between the terminal pin and the terminal holder. The motor terminal may include a terminal block having an internal space, a first opening for communication between the internal space and an external space, and a second opening for communication between the internal space and the external space, and a connection terminal provided in the internal space of the terminal block and configured to connect the terminal pin of the connector inserted into the first opening to a coil of the motor inserted into the second opening. The sealing member may include a first sealing member configured to seal between the first opening and the connector, and a second sealing member configured to seal between the second opening and the coil.

The first sealing member may include a first annular part inserted into the first opening, and having an outer peripheral surface pressed against an inner peripheral surface of the first opening and an inner peripheral surface pressed against an outer peripheral surface of the terminal pin, and a second annular part extending from the first annular part, and having an outer diameter greater than that of the first annular part, the second annular part being disposed in the external space of the terminal block with respect to the first opening, the second annular part being pressed against the insulator.

The first annular part may be compressed between the first opening and the terminal pin.

The first annular part may have a first protrusion formed on the outer peripheral surface thereof, to protrude from the outer peripheral surface of the first annular part and extend in a circumferential direction of the first annular part, the first protrusion may have an outer diameter that is equal to or greater than an inner diameter of the first opening, the first annular part may have an inner diameter that is smaller than or equal to an outer diameter of the terminal pin, a thickness between an outer peripheral surface of the first protrusion and the inner diameter of the first annular part may be greater than a gap between an inner peripheral surface of the first protrusion and the outer peripheral surface of the terminal pin, and when the motor terminal, the connector, and the first sealing member are assembled to each other, the first protrusion may apply pressure to the first opening and the inner peripheral surface of the first annular part may apply pressure to the terminal pin, so that the first annular part is compressed between the first opening and the terminal pin.

The first sealing member may include a first connector insertion hole that is the inner peripheral surface of the first annular part, and a second connector insertion hole that is an inner peripheral surface of the second annular part, the insulator may be inserted into the second connector insertion hole, the second connector insertion hole may have an inner diameter that is reduced as it is away from the first connector insertion hole, and the smallest portion of the inner diameter of the second connector insertion hole may be smaller than an outer diameter of the insulator.

The compressor may further include a casing for accommodating the motor, the compression mechanism, the inverter, the connector, and the sealing member, the casing may include a partition plate that partitions a motor accommodation space, in which the motor is accommodated, an inverter accommodation space, in which the inverter is accommodated, the connector may electrically connect the motor and the inverter through the partition plate, and the first sealing member may further seal between the connector and the partition plate.

The partition plate may have a connector mounting hole formed therein for mounting of the connector such that the connector connects the motor and the inverter through the partition plate. The connector mounting hole may include a first recess formed in the partition plate in an intaglio form from the inverter accommodation space and having a first seating surface for seating of the terminal holder, a second recess formed in an intaglio form from the first seating surface, having an inner diameter smaller than that of the first recess, and having a second seating surface for seating of the second annular part of the first sealing member, and a third recess formed in an intaglio form from the second seating surface, having an inner diameter smaller than that of the second recess, and communicating with the motor accommodation space. The second annular part of the first sealing member may be compressed between the terminal holder and the second seating surface or between the insulator and the second seating surface.

The second annular part may have a bottom surface facing the second seating surface, and an upper surface that forms a back surface of the bottom surface and faces the terminal holder and the insulator, the second annular part may have a second protrusion formed on the upper surface thereof, to protrude from the upper surface of the second annular part, extend in a circumferential direction of the second annular part, and come into contact with the insulator, the second annular part may have a third protrusion formed on the bottom surface thereof, to protrude from the bottom surface of the second annular part, extend in the circumferential direction of the second annular part, and come into contact with the second seating surface, a thickness between a tip surface of the second protrusion and a tip surface of the third protrusion may be greater than a gap between the second seating surface and the insulator, and when the connector, the partition plate, and the first sealing member are assembled to each other, the second protrusion may apply pressure to the insulator and the third protrusion may apply pressure to the second seating surface, so that the second annular part is compressed between the insulator and the second seating surface.

The insulator may be configured such that one end thereof protrudes toward the motor terminal with respect to the terminal holder, the one end of the insulator may have an outer diameter that is gradually reduced as it moves from the terminal holder to the motor terminal while a reduction ratio of the outer diameter is gradually reduced, and the second protrusion may come into contact with a portion, a reduction ratio of an outer diameter of which is largest, of the one end of the insulator.

A portion other than the second protrusion in the second annular part may be spaced apart from the insulator.

The insulator may be made of a glass material, and a portion of the first sealing member, which at least comes into contact with the insulator, may be made of a material with insulation and elasticity.

The first sealing member may further include an annular member interposed between the second annular part and the insulator, the insulator may be made of a glass material, and the annular member may be made of a material with insulation and elasticity.

The annular member may be compressed between the second annular part and the insulator.

The insulator may be configured such that one end thereof protrudes toward the motor terminal with respect to the terminal holder, the one end of the insulator may have an outer diameter that is gradually reduced as it moves from the terminal holder to the motor terminal while a reduction ratio of the outer diameter is gradually reduced, and the annular member may come into contact with a portion, a reduction ratio of an outer diameter of which is largest, of the one end of the insulator.

The second sealing member may include a partition wall configured to cover the second opening, and a coil insertion hole configured to pass through the partition wall for insertion of the coil. The partition wall may include a first partition wall inserted into the second opening and pressed against an inner peripheral surface of the second opening, a second partition wall spaced apart from the first partition wall, disposed in the external space of the terminal block with respect to the second opening, and pressed against to a tip surface of the second opening, and a connection configured to connect the first partition wall to the second partition wall. The coil insertion hole may include a first coil insertion hole that passes through the first partition wall, and a second coil insertion hole that passes through the second partition wall. The coil may be connected to the connection terminal through the second coil insertion hole and the first coil insertion hole, and at least one of the first and second coil insertion holes may have an inner diameter that is smaller than or equal to an outer diameter of the coil.

An isolated space between the first partition wall and the second partition wall may be formed with a third sealing member that seals between the first partition wall and the terminal block, between the second partition wall and the terminal block, between the first coil insertion hole and the coil, and between the second coil insertion hole and the coil.

The second coil insertion hole may have an inner diameter greater than the outer diameter of the coil, and the third sealing member may be injected into the isolated space through the second coil insertion hole, and then be cured.

The terminal block may have an injection hole formed therein for communication between the external space of the terminal block and the isolated space, and the third sealing member may be injected into the isolated space through the injection hole), and then be cured.

One of the terminal block and the second sealing member may be formed with a hook, and the other of the terminal block and the second sealing member may be formed with a ring fastened to the hook.

Advantageous Effects

A compressor according to the present invention includes a sealing member that seals a motor terminal to block introduction of a refrigerant into the motor terminal, and can thus prevent an electric leakage from occurring in the motor terminal. In addition, since the sealing member also seals between a connector and a casing to block introduction of a refrigerant into an inverter accommodation space, it is possible to prevent an electric leakage from occurring in an inverter.

In addition, by means of the sealing member, it is possible to prevent separation of the connector from the motor terminal and to prevent separation of a coil from the motor terminal.

BRIEF DESCRIPTION OF DRAWINGS

FIG. 1 is a cross-sectional view illustrating a conventional compressor.

FIG. 2 is an exploded perspective view illustrating a connector and a motor terminal of FIG. 1.

FIG. 3 is a perspective view illustrating a coil, a motor terminal, and a connector in a compressor according to an embodiment of the present invention.

FIG. 4 is an exploded perspective view of FIG. 3

FIG. 5 is a cross-sectional view of FIG. 3.

FIG. 6 is an exploded perspective view illustrating a motor terminal in a compressor according to another embodiment of the present invention.

FIG. 7 is a cross-sectional view illustrating a state in which the motor terminal of FIG. 6 is assembled to a connector and a coil.

FIG. 8 is a cross-sectional view illustrating a connecting portion between a connector and a motor terminal in a compressor according to a still another embodiment of the present invention.

FIG. 9 is an exploded perspective view illustrating the connector, the motor terminal, and a first sealing member of FIG. 8.

FIG. 10 is a cross-sectional view illustrating a connecting portion between a connector and a motor terminal in a compressor according to a further embodiment of the present invention.

FIG. 11 is an exploded perspective view illustrating the connector, the motor terminal, and a first sealing member of FIG. 10.

BEST MODE FOR INVENTION

A compressor according to exemplary embodiments of the present invention will be described below in detail with reference to the accompanying drawings.

FIG. 3 is a perspective view illustrating a coil, a motor terminal, and a connector in a compressor according to an embodiment of the present invention. FIG. 4 is an exploded perspective of FIG. 3. FIG. 5 is a cross-sectional view of FIG. 3.

Referring to FIGS. 3 to 5, the compressor according to the embodiment of the present invention may include, within a casing 1, a motor 2 that generates driving force, a compression mechanism 3 that is driven by the motor 2 to compress a refrigerant, an inverter 4 that controls the motor 2, a connector 5 that electrically connects the motor 2 and the inverter 4, and a sealing member 6 that seals a mounting portion of the connector 5 to prevent an electric leakage from occurring due to the refrigerant.

The casing 1 may include a first casing 11 that accommodates the motor 2 and the compression mechanism 3 therein, and a second casing 12 that is fastened to the first casing 11 and accommodates the inverter 4 therein.

The first casing 11 may include a partition plate 111 that partitions a motor accommodation space S1, in which the motor 2 is accommodated, an inverter accommodation space S2, in which the inverter 4 is accommodated.

The partition plate 111 may have a connector mounting hole 112 therein for mounting of the connector 5 such that the connector 5 connects the motor 2 and the inverter 4 through the partition plate 111.

The motor 2 may include a stator 21 that is fixedly installed in the casing 1, and a rotator 22 that is accommodated in the stator 21 and is rotated by interaction with the stator 21.

The stator 21 may include a core 211 that has a substantially annular shape and is formed by laminating a plurality of sheets, and a coil 212 that is wound about the core 211.

The rotator 22 may have a substantially cylindrical shape and include a permanent magnet. The outer peripheral surface of the rotator 22 may face the inner peripheral surface of the stator 21 with a predetermined gap therebetween. A rotary shaft 23 may be press-fitted in the center of the rotator 22 to transmit the rotational force of the rotator 22 to the compression mechanism 3.

Meanwhile, the coil 212 may be electrically connected to the connector 5 through a motor terminal 24 that is coupled to the end of the coil 212.

The motor terminal 24 may include a terminal block 241 that defines the external appearance thereof, and a connection terminal 242 that connects the coil 212 to the connector 5 in the terminal block 241.

The terminal block 241 may include an internal space S3, a first opening 2411 through which the internal space S3 communicates with the external space (motor accommodation space) S1, and a second opening 2412 through which the internal space S3 communicates with the external space S1.

The first opening 2411 is formed in an intaglio form from a first outer wall 2413 of the terminal block 241 to pass through the wall of the terminal block 241. The first opening 2411 may have an inner diameter greater than the outer diameter of a terminal pin 52 to be described later such that the terminal pin 52 of the connector 5 is insertable into the first opening 2411.

The second opening 2412 is formed in an intaglio form from a second outer wall 2414 of the terminal block 241 to pass through the wall of the terminal block 241. The second opening 2412 may have an inner diameter greater than the outer diameter of the coil 212 such that the coil 212 is insertable into the second opening 2412.

Meanwhile the terminal block 241 may be pressed against a second partition wall 621*b* of a second sealing member 62 to be described later such that the second opening 2412 is not open inward thereof and the overall second outer wall 2414 is formed on the same plane. Hereinafter, the second outer wall 2414 is referred to as a tip surface 2414 of the second opening.

In addition, the terminal block 241 may have a hook 2415 that is formed on the outer wall thereof for fastening with a ring 621*d* of the second sealing member 62 to be described later. The hook 2415 may protrude from the outer wall of the terminal block 241.

The connection terminal 242 is made of a conductive material and may be provided in the internal space S3 of the terminal block 241.

The connection terminal 242 may electrically connect the connector 5 to the coil 212 in such a manner that one side of the connection terminal 242 is connected to the connector 5 inserted into the first opening 2411 and the other side of the connection terminal 242 is connected to the coil 212 inserted into the second opening 2412.

Here, when a refrigerant is introduced into the internal space S3 of the terminal block 241 through the connecting portion between the first opening 2411 and the connector 5 or the connecting portion between the second opening 2412 and the coil 212, an electric leakage may occur in the connecting portion of the connector 5, the connection terminal 242, and the coil 212. in the present embodiment, this electric leakage can be prevented by the sealing member 6. A detailed description thereof will be given later.

The compression mechanism 3 may include a fixed scroll 31 that is fixedly installed to the casing 1, and an orbiting scroll 32 that defines a compression chamber together with the fixed scroll 31. The orbiting scroll 32 is coupled to the rotary shaft 23 to orbit around the fixed scroll 31 and compresses a refrigerant. Although the compression mechanism 3 includes the fixed scroll 31 and the orbiting scroll 32 to be formed in a scroll manner in the embodiment, it may be formed in various manners. For example, the compression mechanism 3 may be a swash plate type compression mechanism that includes a swash plate and a piston.

The inverter 4 may include a substrate 41, and a variety of elements 42 and an inverter terminal 43 that are installed on the substrate 41. Here, the inverter 4 may be electrically connected to the motor 2, which is connected to the connector 5, by connecting the connector 5 to the inverter terminal 43.

The connector 5 may include a terminal holder 51 that covers the connector mounting hole 112 of the partition plate 111 to seal the motor accommodation space S 1 and the inverter accommodation space S2 and supports the terminal pin 52, the terminal pin 52 that passes through the terminal holder 51, is made of a conductive material, and electrically connects the connection terminal 242 to the inverter 4, and an insulator 53 that insulates between the terminal holder 51 and the terminal pin 52.

Here, the insulator 53 may be made of a ceramic or glass material. In the present embodiment, the insulator 53 may be made of a glass material for a reduction in cost.

The sealing member 6 may include a first sealing member 61 that prevents the refrigerant in the motor accommodation space S1 from being introduced into the internal space of the terminal block 241 through the connecting portion between the first opening 2411 and the connector 5, and second and third sealing members 62 and 63 that prevent the refrigerant in the motor accommodation space S1 from being introduced into the internal space of the terminal block 241 through the connecting portion between the second opening 2412 and the coil 212.

Here, the first sealing member 61 may effectively seal the connecting portion between the first opening 2411 and the connector 5, which is relatively difficult to seal it.

Specifically, the first sealing member 61 may include a first annular part 611 that is inserted into the first opening 2411, and a second annular part 612 that extends from the first annular part 611 and is disposed in the external space S1 of the terminal block 241 with respect to the first opening 2411.

The first annular part 611 may have an outer diameter that is nearly equal to the inner diameter of the first opening 2411 such that the first annular part 611 is insertable into the first opening 2411.

The outer peripheral surface of the first annular part 611 may be pressed against the inner peripheral surface of the first opening 2411, so as to prevent introduction of a refrigerant into the internal space S3 of the terminal block 241 through between the first annular part 611 and the first opening 2411.

Specifically, the first annular part 611 may have a first protrusion P1 that protrudes from the outer peripheral surface of the first annular part 611 and extends circumferentially along the outer peripheral surface of the first annular part 611.

The first protrusion P1 may have an outer diameter, which is greater than the outer diameter of the first annular part 611 and is smaller than the inner diameter of the first opening 2411, so as to be pressed against the inner peripheral surface of the first opening 2411.

The first protrusion P1 may consist of a plurality of first protrusions, and the plurality of first protrusions P1 may be arranged in the axial direction of the first annular part 611.

When the first protrusion P1 is inserted into the first opening 2411, the first protrusion P1 is press-fitted into the first opening 2411 to prevent separation of the first annular part 611 from the first opening 2411. In addition, it is possible to prevent a refrigerant from being introduced from the external space S1 of the terminal block 241 into the internal space S3 of the terminal block 241 through between the first annular par 611 and the first opening 2411.

Here, the first sealing member 61 may be made of a material having a lower hardness than the terminal block 241 (for instance, a material with insulation and elasticity) in order to prevent the first opening 2411 from being damaged due to deformation of the first protrusion P1 when the first protrusion P1 is press-fitted into the first opening 2411.

The inner peripheral surface of the first annular part 611 may be pressed against the outer peripheral surface of the terminal pin 52, so as to prevent introduction of a refrigerant into the internal space S3 of the terminal block 241 through between the first annular part 611 and the terminal pin 52.

That is, assuming that the hole passing through the first and second annular parts 611 and 612 for insertion of the connector 5 in the first sealing member is referred to as a connector insertion hole 613, the connector insertion hole 613 includes a first connector insertion hole 613*a*, which is the inner peripheral surface of the first annular part 611, and a second connector insertion hole 613*b* which communicates with the first connector insertion hole 613*a* and is the inner peripheral surface of the second annular part 612. The first connector insertion hole 613a may have an inner diameter that is nearly equal to the outer diameter of the terminal pin 52 such that the terminal pin 52 is insertable into the first connector insertion hole 613a.

In this case, the first connector insertion hole 613a may have a diameter smaller than the outer diameter of the insulator 53 in order to prevent insertion of the insulator 63 into the first connector insertion hole 613a and prevent the connector 5 from moving toward the internal space S3 of the terminal block 241 instead of moving to a predetermined position.

Here, the first annular part 611 may be compressed between the first opening 2411 and the terminal pin 52. That is, the first protrusion P1 is formed to protrude from the outer peripheral surface of the first annular part 611 and extend in the circumferential direction of the first annular part 611, and may have an outer diameter that is equal to or greater than the inner diameter of the first opening 2411. The first annular part 611 may have an inner diameter that is smaller than or equal to the outer diameter of the terminal pin 52. The thickness between the outer peripheral surface of the first protrusion P1 and the inner diameter of the first annular part 611 may be greater than the gap between the inner peripheral surface of the first opening 2411 and the outer peripheral surface of the terminal pin 52. When the terminal, the connector 5, and the first sealing member 61 are assembled to each other, the first protrusion P1 applies pressure to the first opening 2411, and the inner peripheral surface of the first annular part 611 applies pressure to the terminal pin 52, so that the first annular part 611 may be compressed between the first opening 2411 and the terminal pin 52.

The second annular part 612 may extend from the first annular part 611. That is, the second annular part 612 may be formed integrally with the first annular part 611.

The second annular part 612 may be stepped from the first annular part 611. That is, the second annular part 612 may have an outer diameter greater than the outer diameter of the first annular part 611 and the inner diameter of the first opening 2411. Thus, when the first annular part 611 is inserted into the first opening 2411, the second annular part 612 is latched and supported by the first outer wall 2413 of the terminal block 241, thereby preventing full insertion of the first sealing member 61 into the internal space S3 of the terminal block 241.

The second annular part 612 may serve to fundamentally prevent the refrigerant in the motor accommodation space S1 from being introduced between the first annular part 611 and the terminal pin 52.

As described above, the inner peripheral surface of the second annular part 612 may be the second connector insertion hole 613b. The second connector insertion hole 613b may have an inner diameter that is greater than the inner diameter of the first connector insertion hole 613a and is nearly equal to the outer diameter of the insulator 53 such that the insulator 53 is insertable into the second connector insertion hole 613b.

Here, the inner diameter of the second connector insertion hole 613b may be reduced as the second connector insertion hole 613b is away from the first connector insertion hole 613a in the axial direction of the second connector insertion hole 613b. That is, the second connector insertion hole 613b may be inclined in a so-called inverse gradient manner whereby a portion of the inner diameter of the second connector insertion hole 613b, which is remote from the first connector insertion hole 613a, is smaller than another portion of the inner diameter of the second connector insertion hole 613b, which is adjacent to the first connector insertion hole 613a. The smallest portion of the inner diameter of the second connector insertion hole 613b may be smaller than the outer diameter of the insulator 63. The insulator 63 is press-fitted into the second connector insertion hole 613b when the insulator 63 is inserted into the second connector insertion hole 613b, thereby preventing separation of the insulator 63 from the second connector insertion hole 613b. In addition, it is possible to prevent a refrigerant from being introduced from the external space S1 of the terminal block 241 into the internal space S3 of the terminal block 241 through between the insulator 63 and the second connector insertion hole 613b.

Meanwhile, on the same principle as the first protrusion P1, the first sealing member 61 is made of a material having a lower hardness than the terminal block 241 (for instance, a material with insulation and elasticity). Therefore, the second connector insertion hole 613b (the second annular part 612) can serve to prevent the insulator 63 from being damaged due to deformation of the second connector insertion hole 613b when the insulator 63 is press-fitted into the second connector insertion hole 613b.

The second sealing member 62 may seal between the second opening 2412 and the coil 212.

Specifically, the second sealing member 62 may include a partition wall 621 that covers the second opening 2412, and a coil insertion hole 622 that passes through the partition wall 621 for insertion of the coil 212.

The partition wall 621 may include a first partition wall 621a, a second partition wall. 621b that is spaced apart from the first partition wall 621a, and a connection 621c that connects the first partition wall 621a to the second partition wall 621b.

The first partition wall 621a may be a plate having a shape corresponding to the inner peripheral surface of the second opening 2412.

The first partition wall 621a is inserted into the second opening 2412, and the overall outer peripheral surface of the first partition wall 621a may be pressed against the inner peripheral surface of the second opening 2412.

The second partition wall 621b may be a plate formed to cover the tip surface 2414 of the second opening.

The second partition wall 621b is disposed in the external space S1 of the terminal block 241 with respect to the second opening 2412, and the overall outer peripheral portion of the second partition wall 621b may be pressed against to the tip surface 2414 of the second opening.

The second partition wall 621b may be formed with a ring 621d that is fastened to the hook 2415 of the terminal block 241 to fix the second sealing member 62 to the terminal block 241.

The connection 621c includes a bridge that extends from the first partition wall 621a to the second partition wall 621b such that a third sealing member 63 may be filled in an isolated space S4 between the first partition wall 621a and the second partition wall 621b. The bridge consists of a plurality of bridges, and the plurality of bridges may be spaced apart from each other along the outer peripheral portion of the first partition wall 621a.

The coil insertion hole 622 may include a first coil insertion hole 622a, which passes through the first partition wall 621a, and a second coil insertion hole 622b which passes through the second partition wall 621b.

The first coil insertion hole 622a may have an inner diameter that is nearly equal to the outer diameter of the coil 212 such that the coil 212 may pass through the first coil insertion hole 622a. However, the first coil insertion hole 622a may preferably have an inner diameter that is smaller than or equal to the outer diameter of the coil 212 such that the coil 212 is press-fitted into or pressed against the first coil insertion hole 622*a*, in order to prevent separation of the coil 212 from the first coil insertion hole 622*a*, to prevent a refrigerant from being introduced into the internal space S3 of the terminal block 241 through between the coil 212 and the first coil insertion hole 622*a*, and to prevent the third sealing member 63, which is in a liquid or gel phase before curing, from being introduced into the internal space S3 of the terminal block 241 through between the coil 212 and the first coil insertion hole 622*a*.

The second coil insertion hole 622*b* may have an inner diameter that is nearly equal to the outer diameter of the coil 212 such that the coil 212 may pass through the second coil insertion hole 622*b*. However, the second coil insertion hole 622*b* may preferably have an inner diameter greater than the outer diameter of the coil 212 such that the third sealing member 63, which is in a liquid or gel phase before curing, may be injected into the isolated space S4 through the second coil insertion hole 622*b*.

The third sealing member 63 may be made of a resin material.

The third sealing member 63 may be injected into the isolated space S4 between the first partition wall 621*a* and the second partition wall 621*b* through the second coil insertion hole 622*b*, and may then be cured.

Here, the third sealing member 63 may be injected into the isolated space S4 through the second coil insertion hole 622*b*, and then be cured, after the connection terminal 242 is installed in the internal space S3 of the terminal block 241, the second sealing member 62 is installed in the second opening 2412 of the terminal block 241, and the coil 212 is connected to the connection terminal 242 by sequentially passing through the second coil insertion hole 622*b* and the first coil insertion hole 622*a* from the external space S1 of the terminal block 241.

The third sealing member 63 can more effectively prevent introduction of a refrigerant into the internal space S3 of the terminal block 241 through between the second sealing member 62 and the terminal block 241 or between the second sealing member 62 and the coil 212, by assisting the second sealing member 62. That is, the third sealing member 63 may seal between the first partition wall 621*a* and the terminal block 241, between the second partition wall 621*b* and the terminal block 241, between the first coil insertion hole 622*a* and the coil 212, and between the second coil insertion hole 622*b* and the coil 212.

The third sealing member 63 can prevent separation of the coil 212 from the motor terminal 24 by assisting the second sealing member 62.

Hereinafter, the action and effect of the compressor according to the present embodiment will be described.

That is, when electric power applied to the motor 2, a series of processes is repeated in which the compression mechanism 3 sucks, compresses, and discharges a refrigerant by driving force transmitted from the motor 2, and the discharged refrigerant is discharged to the outside of the compressor. In such a process, the motor 2 is controlled by the inverter 4, which is electrically connected thereto through the connector 5, thereby enabling cooling efficiency to be variably controlled.

Here, the compressor according to the present embodiment includes the first sealing member 61 that seals between the connector 5 and the motor terminal 24 to block introduction of a refrigerant into the motor terminal 24, and can thus prevent an electric leakage from occurring in the motor terminal 24. That is, it is possible to prevent the current flowing in the coil 212, the connection terminal 242, and the connector 5 from being shorted to the terminal block 241. Thus, it is possible to prevent malfunction and damage of the compressor caused by the short circuit of the motor terminal 24.

Since the compressor includes the second and third sealing members 62 and 63 that seal between the coil 212 and the motor terminal 24, it is possible to more effectively prevent malfunction and damage of the compressor caused by the short circuit of the motor terminal 24.

It is possible to prevent separation of the connector 5 from the motor terminal 24 by the first sealing member 61 and to prevent separation of the coil 212 from the motor terminal 24 by the second and third sealing members 62 and 63.

Although the second coil insertion hole 622*b* has an inner diameter than the outer diameter of the coil 212 such that the third sealing member 63 is injectable through the second coil insertion hole 622*b* in the present embodiment, the second coil insertion hole 622*a* may have an inner diameter that is nearly equal to the inner diameter of the first coil insertion hole 622*a*, as illustrated in FIGS. 6 and 7. That is, the second coil insertion hole 622*b* may have an inner diameter that is smaller than or equal to the outer diameter of the coil 212 such that the coil 212 is press-fitted into or pressed against the second coil insertion hole 622*b*, in order to prevent separation of the coil 212 from the second coil insertion hole 622*b*, to prevent a refrigerant from being introduced into the internal space S3 of the terminal block 241 through between the coil 212 and the second coil insertion hole 622*b*, and to prevent the third sealing member 63, which is in a liquid or gel phase before curing, from leaking into the external space S1 of the terminal block 241 from the isolated space S4 through between the coil 212 and the second coil insertion hole 622*b*.

In this case, the terminal block 241 may have an injection hole 2416 formed therein for communication between the external space S1 of the terminal block 241 and the isolated space S4, and the third sealing member 63 may be injected into the isolated space S4 through the injection hole 2416, and then be cured.

Meanwhile, the motor 2 may be a three-phase motor with U, V, and W phases. Thus, the coil 212, the motor terminal 24, and the connector 5 may be formed corresponding to three phases. Although the first sealing member 61 consists of three first sealing members that are separated from each other in the present embodiment, the three first sealing members 61 may be formed integrally with each other, as illustrated in FIGS. 6 and 7. In this case, it is possible to reduce the time and manufacturing cost required to assemble the first sealing member 61 to the terminal block 241.

The third sealing member 63 is provided in the present embodiment. However, although not separately illustrated in the drawings, the third sealing member 63 may be omitted. That is, the motor terminal 24 includes the first and second sealing members 61 and 62 and the first and second sealing members 61 and 62 seal the internal space S3 of the terminal block 241, thereby preventing separation of the connector 5 and the coil 212 from the motor terminal 24.

In the present embodiment, the first annular part 611 of the first sealing member 61 may have an outer diameter that is nearly equal to the inner diameter of the first opening 2411 and may include the first protrusion P1 having an outer diameter greater than the inner diameter of the first opening 2411, such that the first annular part 611 is press-fitted into and easily insertable into the first opening 2411. However, although not separately illustrated in the drawings, the overall outer diameter of the first annular part 611 is greater than the inner diameter of the first opening 2411 so that the overall first annular part 611 may be press-fitted into the first opening 2411, without the first protrusion P 1. In this case, it is slight difficult to insert the first annular part 611 into the first opening 2411, but it is possible to more effectively prevent a refrigerant from being introduced into the internal space S3 of the terminal block 241 through between the first annular part 611 and the first opening 2411 and to more effectively prevent separation of the first sealing member 61 from the first opening 2411. In addition, the inner diameter of the first connector insertion hole 613a is reduced when the first annular part 611 is press-fitted into the first opening 2411 and is deformed, thereby further improving the fastening force between the first annular part 611 and the terminal pin 52 of the connector 5. Therefore, it is possible to more effectively prevent separation of the connector 5 from the first sealing member 61.

In the present embodiment, only a portion of the connector insertion hole 613 may be smaller than the outer diameter of the connector 5 such that the connector 5 is press-fitted into and easily inserted into the first sealing member 61. That is, only a portion of the inner diameter of the second connector insertion hole 613b may be smaller than the outer diameter of the insulator 53. However, although not separately illustrated in the drawings, the overall inner diameter of the second connector insertion hole 613b may be smaller than the outer diameter of the insulator 53 so that the insulator 53 is press-fitted into the overall second connector insertion hole 613b. In addition, the overall inner diameter of the first connector insertion hole 613a may also be smaller than the outer diameter of the terminal pin 52 so that the terminal pin 52 is press-fitted into the overall first connector insertion hole 613a. In this case, it is slight difficult to insert the connector 5 into the connector insertion hole 613, but it is possible to more effectively prevent a refrigerant from being introduced into the internal space S3 of the terminal block 241 through between the connector 5 and the connector insertion hole 613 and to more effectively prevent separation of the connector 5 from the connector insertion hole 613.

In the present embodiment, the hook 2415 is formed in the terminal block 241 and the ring 621d is formed in the second sealing member 62. However, although not separately illustrated in the drawings, the hook 2415 may be formed in the second sealing member 62 and the ring 621d may be formed in the second sealing member 62.

Although the insulator 52 is inserted into the first sealing member 61 in the present embodiment, this may be modified as a still another embodiment illustrated in FIGS. 8 and 9.

FIG. 8 is a cross-sectional view illustrating a connecting portion between a connector and a motor terminal in a compressor according to a still another embodiment of the present invention. FIG. 9 is an exploded perspective view illustrating the connector, the motor terminal, and a first sealing member of FIG. 8.

Referring to FIGS. 8 and 9, in the compressor according to the still another embodiment of the present invention, a connector mounting hole 112 may include a first recess 1121 that communicates with an inverter accommodation space S2, a second recess 1122 that is formed in an intaglio form from the first recess 1121, and a third recess 1123 that is formed in an intaglio form from the first and second recesses 1121 and 1122 and communicates with a motor accommodation space S1.

The first recess 1121 is formed in the partition plate 111 in an intaglio form from the inverter accommodation space S2, and may have a first seating surface 1121a for seating of a terminal holder 51 of a connector 5 which will be described later.

The second recess 1122 is formed in an intaglio form from the first seating surface 1121a and has an inner diameter smaller than the inner diameter of the first recess 1121. The second recess 1122 may have a second seating surface 1122a for seating of a second annular part 612 of a first sealing member 61 which will be described later.

The third recess 1123 is formed in an intaglio form from the second seating surface 1122a and may have an inner diameter smaller than the inner diameter of the second recess 1122.

The second annular part 612 may have an outer diameter greater than the outer diameter of a first annular part 611 so as to prevent the refrigerant in the motor accommodation space S1 from being introduced between the first annular part 611 and the a terminal pin 52 through between the partition plate 111 and the second annular part 612 and between the second annular part 612 and the connector 5, and the outer peripheral surface of the second annular part 612 may be compressed between the second seating surface 1122a of the second recess 1122 and the terminal holder 51 or between the second seating surface 1122a and an insulator 53. In the present embodiment, the second annular part 612 may be compressed between the second seating surface 1122a and the insulator 53 to increase an insulation creeping distance by contact with the insulator 53. That is, in the present embodiment, the second annular part 612 may have a bottom surface that faces the second seating surface 1122a, and an upper surface that forms the back surface of the bottom surface and faces the terminal holder 51 and the insulator 53. The second annular part 612 may have a second protrusion P2 that protrudes from the upper surface of the second annular part 612, extends in the circumferential direction of the second annular part 612, and comes into contact with the insulator 53. The second annular part 612 may have a third protrusion P3 that protrudes from the bottom surface of the second annular part 612, extends in the circumferential direction of the second annular part 612, and comes into contact with the second seating surface 1122a. The thickness between the tip surface of the second protrusion P2 and the tip surface of the third protrusion P3 may be greater than the gap between the second seating surface 1122a and the insulator 53. When the connector 5, the partition plate 111, and a sealing member 6 are assembled to each other, the second protrusion P2 applies pressure to the insulator 53, and the third protrusion P3 applies pressure to the second seating surface 1122a, so that the second annular part 612 may be compressed between the insulator 53 and the second seating surface 1122a.

Here, the first sealing member 61 may be generally made of a material with insulation and elasticity. That is, both of the first and second annular parts 611 and 612 may be made of a material with insulation and elasticity. Thus, it is possible to more effectively prevent the refrigerant in the motor accommodation space S1 from being introduced into the internal space of the terminal block 241, to further improve insulation between the terminal pin 52 and the terminal holder 51 and between the terminal pin 52 and the terminal block 241, and to prevent damage of the partition plate 111, the connector 5, and the terminal block 241 by the first sealing member 61.

In more detail, since the first annular part 61 is made of an elastic material, the first annular part 611 may be easily compressed between the first opening 2411 and the terminal pin 52. Accordingly, since the outer peripheral surface (more exactly, the first protrusion P1) of the first annular part 611 is further pressed against the inner peripheral surface of the first opening 2411, it is possible to more effectively introduction of a refrigerant into the internal space of the terminal block 241 through between the first annular part 611 and the first opening 2411. Since the inner peripheral surface of the first annular part 611 is further pressed against the outer peripheral surface of the terminal pin 52, it is possible to more effectively introduction of a refrigerant into the internal space of the terminal block 241 through between the inner peripheral surface of the first annular part 611 and the terminal pin 52. Since the first annular part 611 is made of an elastic material, it is possible to prevent deformation (damage) of the first opening 2411 and the terminal pin 52 by the first annular part 611. In addition, since the first annular part 611 is made of an insulating material, it is possible to prevent an electric leakage from occurring between the terminal pin 52 and the first opening 2411.

Since the second annular part 612 is made of an elastic material, the second annular part 612 may be easily compressed between the insulator 53 and the second seating surface 1122a. Accordingly, since the bottom surface (more exactly, the third protrusion P3) of the second annular part 612 is further pressed against the second seating surface 1122a, it is possible to more effectively a refrigerant from passing between the bottom surface of the second annular part 612 and the second seating surface 1122a. Since the upper surface (more exactly, the second protrusion P2) of the second annular part 612 is pressed against the insulator 53, it is possible to more effectively prevent a refrigerant from passing between the upper surface of the second annular part 612 and the insulator 53. Here, since primary sealing is performed between the bottom surface of the second annular part 612 and the second seating surface 1122a and secondary sealing is performed between the upper surface of the second annular part 612 and the insulator 53, the introduction of a refrigerant between the first annular part 611 and the terminal. pin 52 can be significantly reduced. Since the second annular part 612 is made of an elastic material, it is possible to prevent deformation (damage) of the insulator 53 and the second seating surface 1122a by the second annular part 612. Especially, the second annular part 612 made of an elastic material can effectively prevent damage of the insulator 53 made of a fragile ceramic or glass material. Moreover, since a portion other than the second protrusion P2 in the second annular part 612 is spaced apart from the insulator 53, it is possible to prevent application of an unnecessary force to the insulator 53 and to more effectively prevent damage of the insulator 53. In addition, since the second annular part 612 is made of an insulating material, it is possible to improve insulation between the terminal pin 52 and the terminal holder 51 and insulation between the terminal pin 52 and the partition plate 111 by assistance of the insulator 53.

The second annular part 612 (more exactly, the second protrusion P2) may be pressed against a predetermined portion of the insulator 53 in order to more effectively seal between the second annular part 612 and the insulator 53. In more detail, the insulator 53 is made of a glass material for a reduction in cost, as described above. However, the surface of the insulator 53 is irregular and the dimension (tolerance) of the insulator 53 is not easily managed due to the characteristics of glass, and for this reason it may not be easy to seal between the insulator 53 and the second annular part 612. Accordingly, in the present embodiment, the second annular part 612 may be configured to come into contact with a relatively regular (even) portion of the surface of the insulator 53. That is, the insulator 53 may be configured such that one end 531 of the insulator 53 protrudes toward the motor terminal 24 with respect to the terminal holder 51 and has an outer diameter that is gradually reduced as it moves from the terminal holder 51 to the motor terminal 24, and the reduction ratio of the outer diameter is gradually reduced. In this case, the second annular part 612 may come into contact with a portion 5311, the reduction ratio of the outer diameter of which is largest, of one end 531 of the insulator 53. Therefore, it is possible to easily and effectively seal between the insulator 53 and the second annular part 612 even though the insulator 53 is made of a glass material.

The sealing between the second annular part 612 (more exactly, the third protrusion P3) and the second seating surface 1122a can also prevent the refrigerant in the motor accommodation space S1 from being introduced into the inverter accommodation space S2. That is, it is possible to a refrigerant from leaking into the inverter accommodation space S2 through between the first seating surface 1121a and the terminal holder 51. Thus, it is possible to prevent a short circuit of the inverter 4 due to the refrigerant.

Through such a configuration, the first sealing member 61 is made of an elastic material, and is compressed between the first opening 2411 and the terminal pin 52 and between the insulator 53 and the second seating surface 1122a. Accordingly, it is possible to more effectively block introduction of a refrigerant into the motor terminal 24, to prevent deformation (damage) of the partition plate 111, the terminal block 241, and the insulator 53, and to prevent introduction of a refrigerant into the inverter accommodation space S2 to prevent the short circuit of the inverter 4.

Particularly, since the second annular part 612 of the first sealing member 61 is made of an elastic material, the second annular part 612 may be pressed against the insulator 53, the sealing of which is difficult, and may effectively seal the insulator 53 and the second annular part 612.

Since the second annular part 612 is pressed against the portion 5311, the reduction ratio of the outer diameter of which is largest and which is a relatively flat portion of the insulator 53, it is possible to more effectively seal between the second annular part 612 and the insulator 53.

Since the second annular part 612 includes the second protrusion P2 that comes into contact with the insulator 53 and a portion other than the second protrusion P2 is spaced apart from the insulator 53, it is possible to prevent application of an unnecessary force to the insulator 53 and to more effectively prevent damage of the insulator 53 by the first sealing member 61.

Since the first sealing member 61 is made of an insulating material, it is possible to improve insulation between the terminal pin 52 and the terminal block 241 and between the terminal pin 52 and the partition plate 111. By the improvement in insulation, the size of the insulator 53 can be reduced.

Although the second annular part 612 is pressed against the insulator 53 in the above-mentioned embodiment, a first sealing member 61 may further include a separate annular member 614 that is pressed against an insulator 53 instead of a second annular part 612.

FIG. 10 is a cross-sectional view illustrating a connecting portion between a connector and a motor terminal in a compressor according to a further embodiment of the present invention. FIG. 11 is an exploded perspective view illustrating the connector, the motor terminal, and a first sealing member of FIG. 10.

Referring to FIGS. 10 and 11, a first sealing member 61 further includes an annular member 614 interposed between a second annular part 612 and an insulator 53. The annular member 614 is made of a material with insulation and elasticity, and may be compressed between the second annular part 612 and the insulator 53. The annular member 614 may be pressed against a portion 5311, the reduction ratio of the outer diameter of which is largest and which is a relatively flat portion of the insulator 53. In this case, the action and effect thereof may be equal to them of the above-mentioned embodiment. However, since at least one of the first and second annular parts 611 and 612 is made of a material with low elasticity (large strength), it is possible to improve a design degree of freedom.

Both the first and second annular parts 611 and 612 are formed to perform a sealing function in the above-mentioned embodiment. However, although not illustrated in the drawings, only the first annular part 612 may be formed to perform a sealing function. That is, the second annular part 612 may not be compressed between the partition plate 111 (more exactly, the second seating surface 1122a) and the connector 5 (more exactly, the insulator 53).

INDUSTRIAL APPLICABILITY

The present invention relates to a compressor capable of compressing a refrigerant using driving force of a motor controlled by an inverter, and can provide a compressor capable of preventing an electric leakage from occurring in an electric circuit between an inverter and a motor due to a refrigerant.

The invention claimed is:
1. A compressor comprising:
a motor configured to generate a driving force;
a compression mechanism driven by the motor to compress a refrigerant;
an inverter configured to control the motor;
a connector configured to electrically connect the motor and the inverter; and
a sealing member configured to seal a motor terminal of the motor that is electrically connected to the connector,
wherein the connector comprises:
a terminal pin configured to electrically connect the motor and the inverter,
a terminal holder configured to support the terminal pin; and
an insulator configured to insulate between the terminal pin and the terminal holder,
wherein the motor terminal comprises:
a terminal block having an internal space, a first opening for communication between the internal space and an external space, and a second opening for communication between the internal space and the external space; and
a connection terminal provided in the internal space of the terminal block and configured to connect the terminal pin of the connector inserted into the first opening to a coil of the motor inserted into the second opening,
wherein the sealing member comprises a first sealing member configured to seal between the first opening and the connector, and
wherein the first sealing member comprises:
a first annular part inserted into the first opening, and having an outer peripheral surface pressed against an inner peripheral surface of the first opening and an inner peripheral surface pressed against an outer peripheral surface of the terminal pin; and a second annular part extending from the first annular part, and having an outer diameter greater than that of the first annular part, the second annular part being disposed in the external space of the terminal block with respect to the first opening, the second annular part being pressed against the insulator.

2. The compressor according to claim 1, wherein the first annular part is compressed between the first opening and the terminal pin.

3. The compressor according to claim 2, wherein:
the first annular part has a first protrusion formed on the outer peripheral surface thereof, to protrude from the outer peripheral surface of the first annular part and extend in a circumferential direction of the first annular part;
the first protrusion has an outer diameter that is equal to or greater than an inner diameter of the first opening;
the first annular part has an inner diameter that is smaller than or equal to an outer diameter of the terminal pin;
a thickness between an outer peripheral surface of the first protrusion and the inner diameter of the first annular part is greater than a gap between the inner peripheral surface of the first opening and the outer peripheral surface of the terminal pin; and
when the motor terminal, the connector, and the first sealing member are assembled to each other, the first protrusion applies pressure to the first opening, and the inner peripheral surface of the first annular part applies pressure to the terminal pin, so that the first annular part is compressed between the first opening and the terminal pin.

4. The compressor according to claim 1, wherein:
the first sealing member comprises a first connector insertion hole that is the inner peripheral surface of the first annular part, and a second connector insertion hole that is an inner peripheral surface of the second annular part;
the insulator is inserted into the second connector insertion hole;
the second connector insertion hole has an inner diameter that is reduced as it is away from the first connector insertion hole; and
the smallest portion of the inner diameter of the second connector insertion hole is smaller than an outer diameter of the insulator.

5. The compressor according to claim 1, further comprising a casing for accommodating the motor, the compression mechanism, the inverter, the connector, and the sealing member, wherein:
the casing comprises a partition plate that partitions a motor accommodation space, in which the motor is accommodated, an inverter accommodation space, in which the inverter is accommodated;
the connector electrically connects the motor and the inverter through the partition plate; and
the first sealing member further seals between the connector and the partition plate.

6. The compressor according to claim 5,
wherein the partition plate has a connector mounting hole formed therein for mounting of the connector such that the connector connects the motor and the inverter through the partition plate;
wherein the connector mounting hole comprises:
a first recess formed in the partition plate in an intaglio form from the inverter accommodation space and having a first seating surface for seating of the terminal holder;

a second recess formed in an intaglio form from the first seating surface, having an inner diameter smaller than that of the first recess, and having a second seating surface for seating of the second annular part of the first sealing member; and
a third recess formed in an intaglio form from the second seating surface, having an inner diameter smaller than that of the second recess, and communicating with the motor accommodation space, and
wherein the second annular part of the first sealing member is compressed between the terminal holder and the second seating surface or between the insulator and the second seating surface.

7. The compressor according to claim 6, wherein:
the second annular part has a bottom surface facing the second seating surface, and an upper surface that forms a back surface of the bottom surface and faces the terminal holder and the insulator;
the second annular part has a second protrusion formed on the upper surface thereof, to protrude from the upper surface of the second annular part, extend in a circumferential direction of the second annular part, and come into contact with the insulator;
the second annular part has a third protrusion formed on the bottom surface thereof, to protrude from the bottom surface of the second annular part, extend in the circumferential direction of the second annular part, and come into contact with the second seating surface;
a thickness between a tip surface of the second protrusion and a tip surface of the third protrusion is greater than a gap between the second seating surface and the insulator; and
when the connector, the partition plate, and the first sealing member are assembled to each other, the second protrusion applies pressure to the insulator, and the third protrusion applies pressure to the second seating surface, so that the second annular part is compressed between the insulator and the second seating surface.

8. The compressor according to claim 7, wherein:
the insulator is configured such that one end thereof protrudes toward the motor terminal with respect to the terminal holder;
the one end of the insulator has an outer diameter that is gradually reduced as it moves from the terminal holder to the motor terminal while a reduction ratio of the outer diameter is gradually reduced; and
the second protrusion comes into contact with a portion, a reduction ratio of an outer diameter of which is largest, of the one end of the insulator.

9. The compressor according to claim 7, wherein a portion other than the second protrusion in the second annular part is spaced apart from the insulator.

10. The compressor according to claim 1, wherein:
the insulator is made of a glass material; and
a portion of the first sealing member, which at least comes into contact with the insulator, is made of a material with insulation and elasticity.

11. The compressor according to claim 1, wherein:
the first sealing member further comprises an annular member interposed between the second annular part and the insulator;
the insulator is made of a glass material; and
the annular member is made of a material with insulation and elasticity.

12. The compressor according to claim 11, wherein the annular member is compressed between the second annular part and the insulator.

13. The compressor according to claim 12, wherein:
the insulator is configured such that one end thereof protrudes toward the motor terminal with respect to the terminal holder;
the one end of the insulator has an outer diameter that is gradually reduced as it moves from the terminal holder to the motor terminal while a reduction ratio of the outer diameter is gradually reduced; and
the annular member comes into contact with a portion, a reduction ratio of an outer diameter of which is largest, of the one end of the insulator.

14. A compressor comprising:
a motor configured to generate a driving force;
a compression mechanism driven by the motor to compress a refrigerant;
an inverter configured to control the motor,
a connector configured to electrically connect the motor and the inverter; and
a sealing member configured to seal a motor terminal of the motor that is electrically connected to the connector,
wherein the connector comprises:
a terminal pin configured to electrically connect the motor and the inverter,
a terminal holder configured to support the terminal pin; and
an insulator configured to insulate between the terminal pin and the terminal holder,
wherein the motor terminal comprises:
a terminal block having an internal space, a first opening for communication between the internal space and an external space, and a second opening for communication between the internal space and the external space; and
a connection terminal provided in the internal space of the terminal block and configured to connect the terminal pin of the connector inserted into the first opening to a coil of the motor inserted into the second opening,
wherein the sealing member comprises a second sealing member configured to seal between the second opening and the coil,
wherein the second sealing member comprises:
a partition wall configured to cover the second opening; and
a coil insertion hole configured to pass through the partition wall for insertion of the coil,
wherein the partition wall comprises:
a first partition wall inserted into the second opening and pressed against an inner peripheral surface of the second opening;
a second partition wall spaced apart from the first partition wall, disposed in the external space of the terminal block with respect to the second opening, and pressed against to a tip surface of the second opening; and
a connection configured to connect the first partition wall to the second partition wall,
wherein the coil insertion hole comprises a first coil insertion hole that passes through the first partition wall, and a second coil insertion hole that passes through the second partition wall,
wherein the coil is connected to the connection terminal through the second coil insertion hole and the first coil insertion hole, and
wherein at least one of the first and second coil insertion holes has an inner diameter that is smaller than or equal to an outer diameter of the coil.

15. The compressor according to claim 14, wherein an isolated space between the first partition wall and the second partition wall is formed with a third sealing member that seals between the first partition wall and the terminal block, between the second partition wall and the terminal block, between the first coil insertion hole and the coil, and between the second coil insertion hole and the coil.

16. The compressor according to claim 15, wherein:
the second coil insertion hole has an inner diameter greater than the outer diameter of the coil; and
the third sealing member is injected into the isolated space through the second coil insertion hole, and is then cured.

17. The compressor according to claim 15, wherein:
the terminal block has an injection hole formed therein for communication between the external space of the terminal block and the isolated space; and
the third sealing member is injected into the isolated space through the injection hole, and is then cured.

18. The compressor according to claim 14, wherein:
one of the terminal block and the second sealing member is formed with a hook; and
the other of the terminal block and the second sealing member is formed with a ring fastened to the hook.

* * * * *